Figure 1:
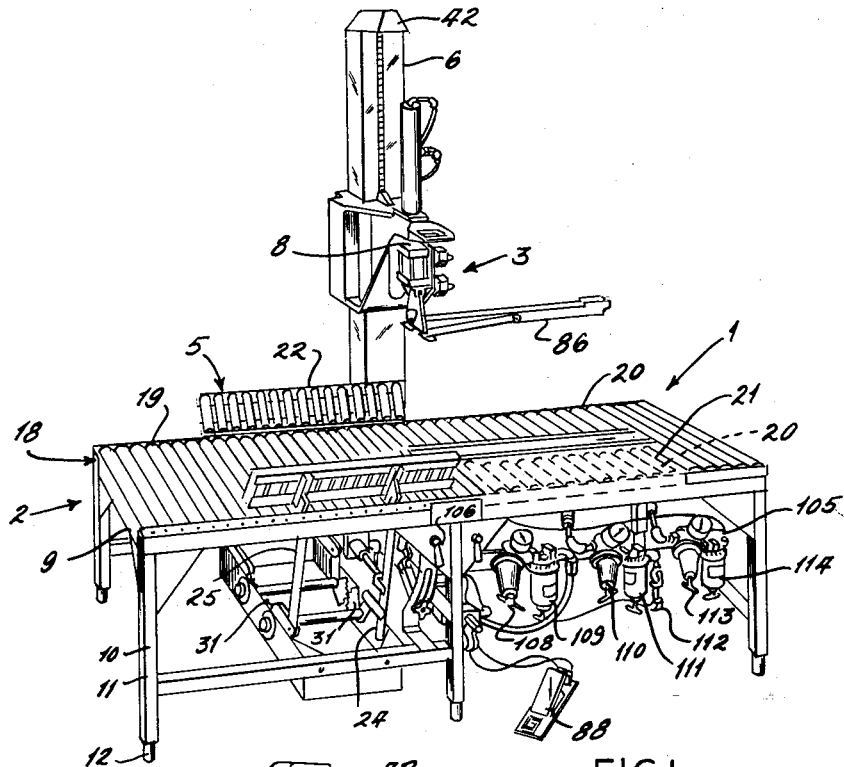

May 4, 1965 W. SCHAFROTH 3,181,730
HIGH SPEED TABLE STAPLING MACHINE
Filed May 16, 1963 7 Sheets-Sheet 1

INVENTOR:
WERNER SCHAFROTH
BY Gravely, Lieder & Woodruff
ATTORNEYS.

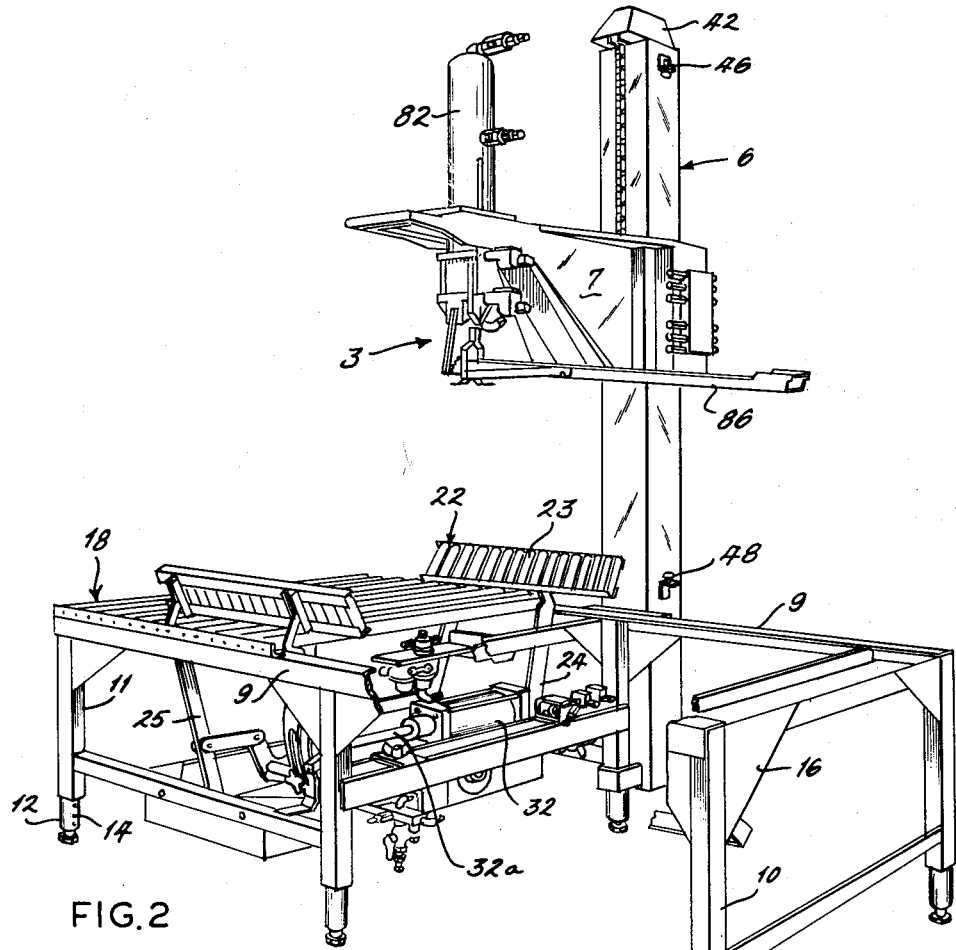
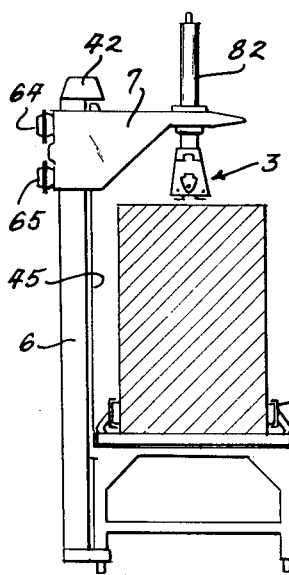
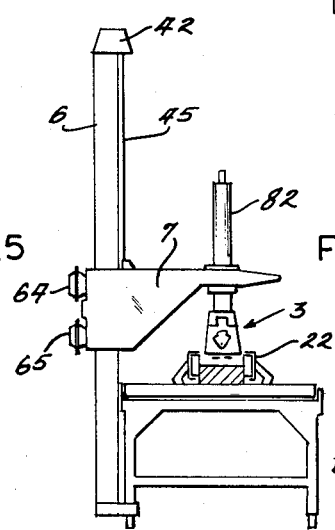

May 4, 1965  W. SCHAFROTH  3,181,730
HIGH SPEED TABLE STAPLING MACHINE
Filed May 16, 1963  7 Sheets-Sheet 3

INVENTOR:
WERNER SCHAFROTH
BY Gravely, Lieder & Woodruff
ATTORNEYS.

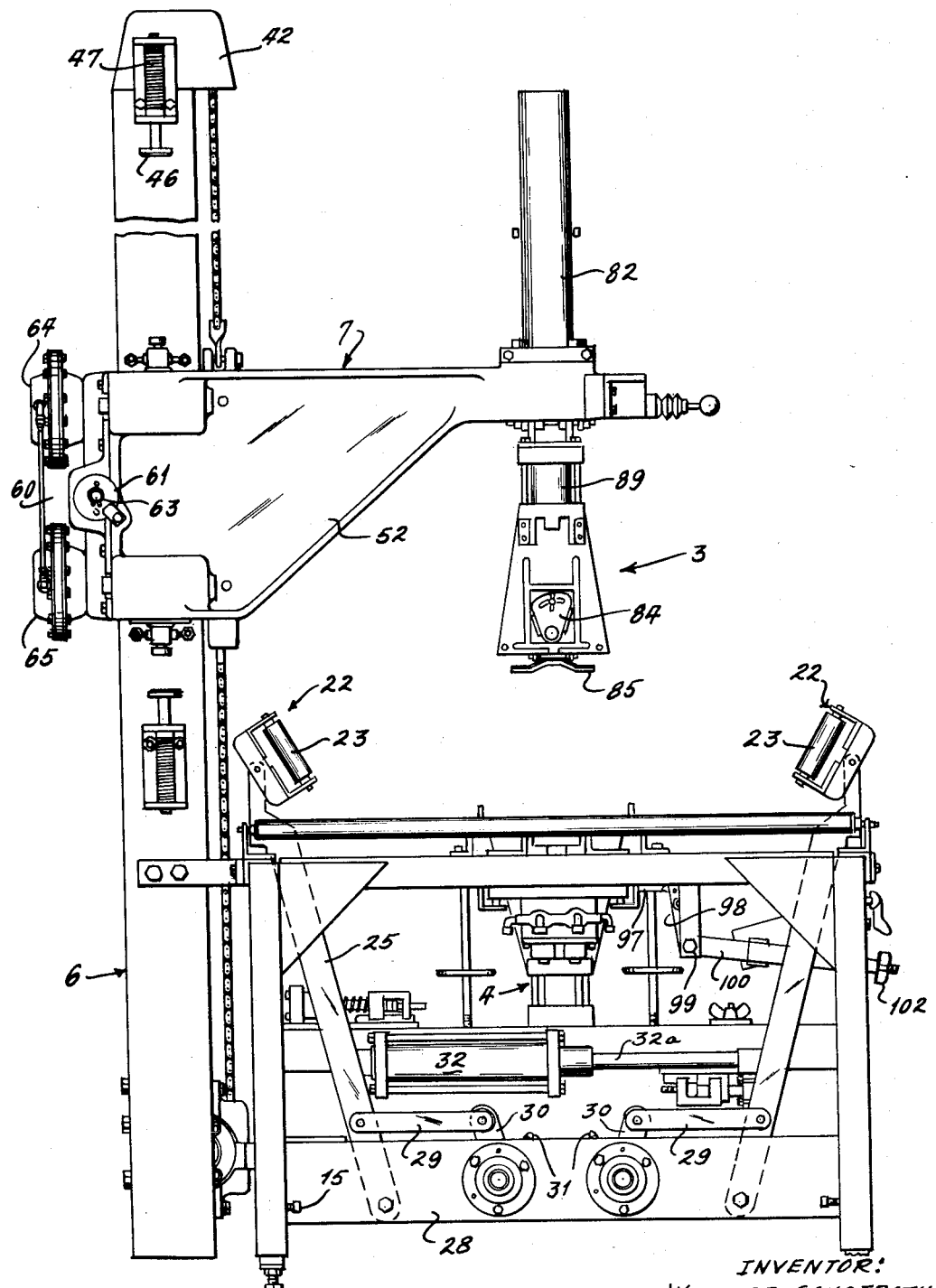

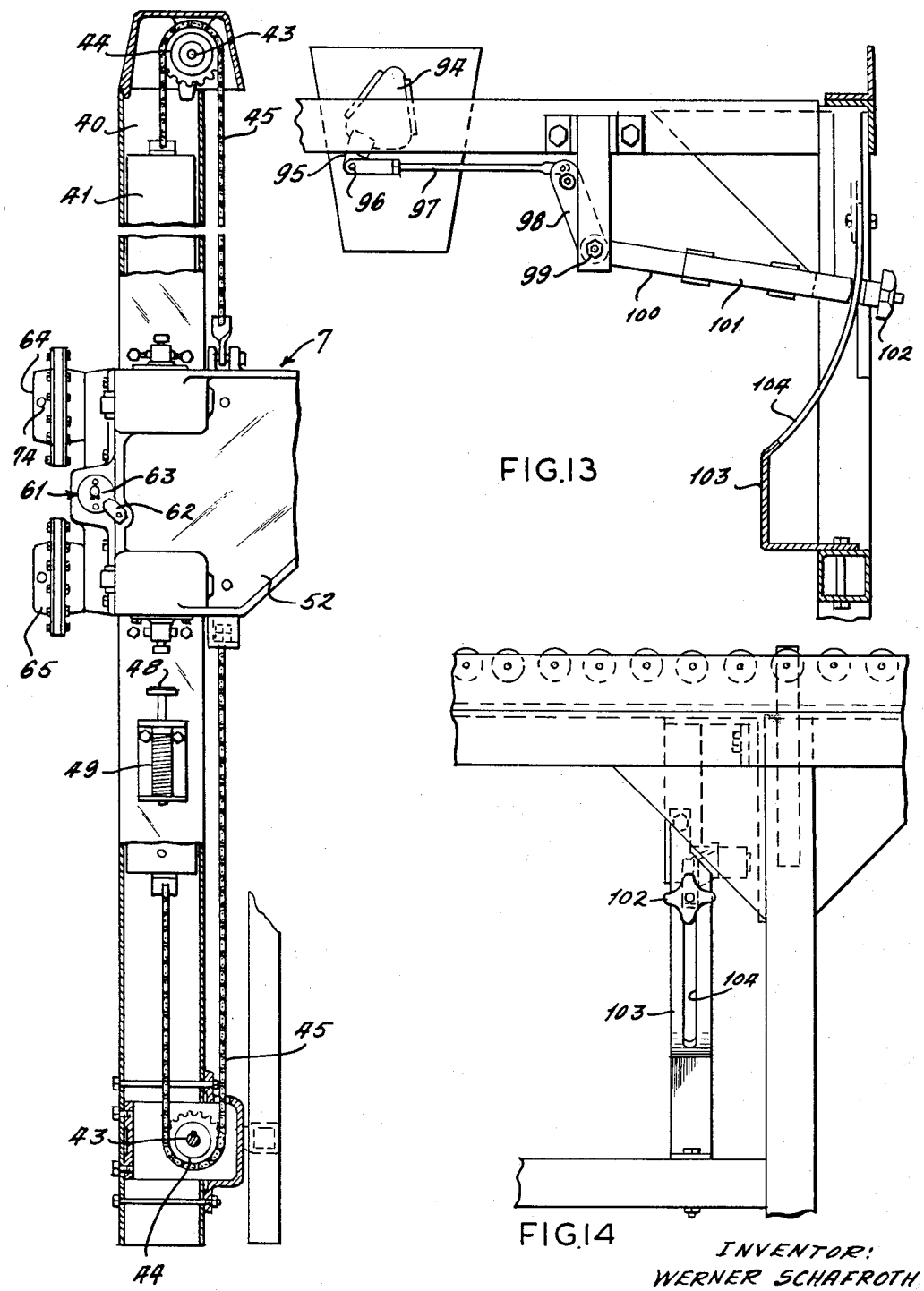

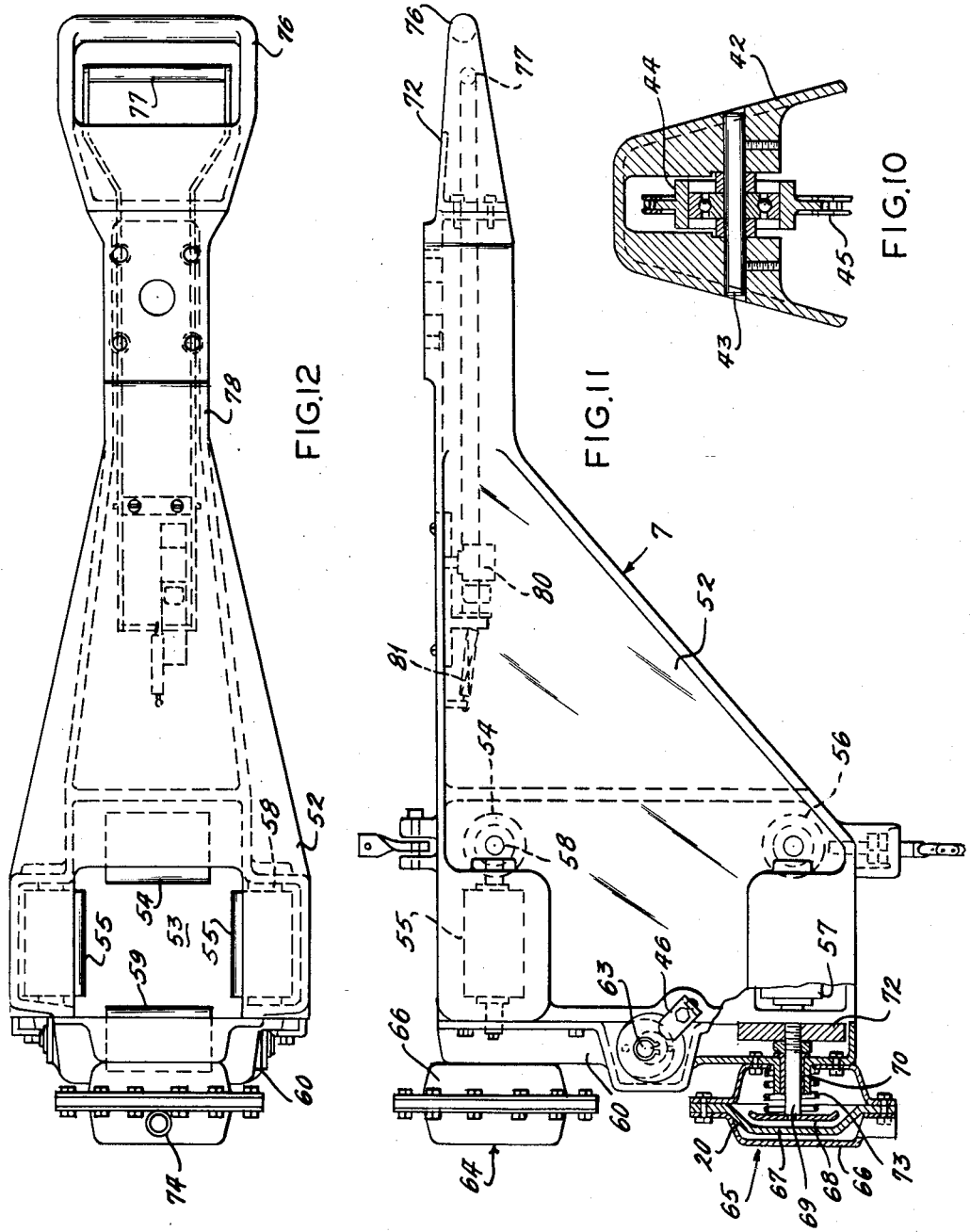

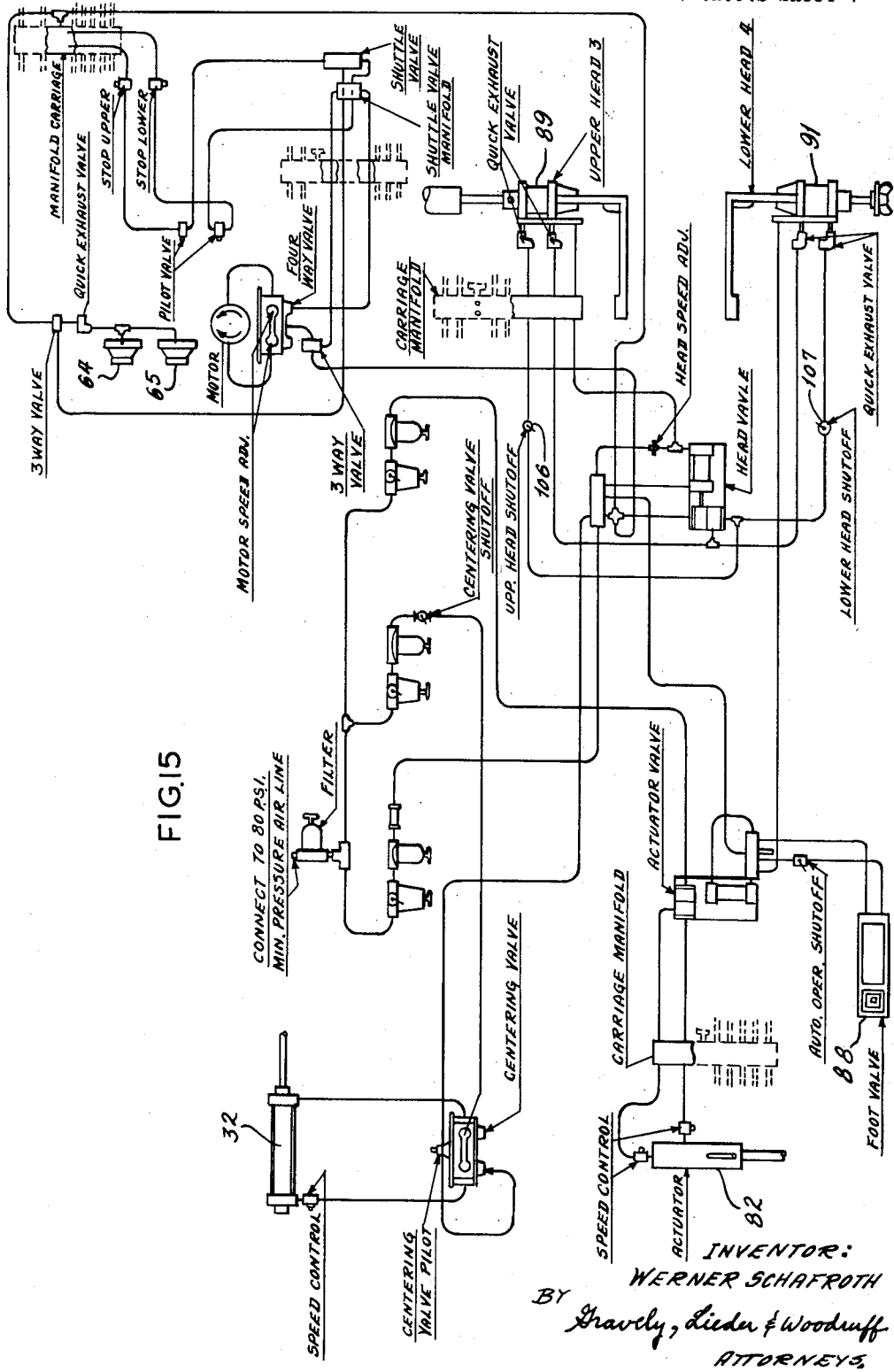

United States Patent Office 3,181,730
Patented May 4, 1965

3,181,730
HIGH SPEED TABLE STAPLING MACHINE
Werner Schafroth, P.O. Box 247, Herrin, Ill.
Filed May 16, 1963, Ser. No. 280,850
5 Claims. (Cl. 227—7)

This invention relates generally to table stapling machines having one or more stapling heads therein, and more particularly, to a high speed table stapling machine which is reversible, fully pneumatically operated, whose height can be varied, which can be knocked-down, which has a safety hinge for the movable stapling head, which has automatic carton centering means, which has means easily accessible to the operator for adjusting the penetration of the lower head of the stapling machine, and which has an upper conveyor roller section removable to allow servicing of the machine from the top. The present machine is an improvement on the machine shown in the Schafroth Patent No. 2,894,262 dated July 14, 1959.

Staples are commonly used for closing cartons or master shipping containers which are filled or loaded with goods. The stapling machines which are used are preferably of the retractable anvil type wherein anvils are projected from the bottom edge of the stapling machine itself and penetrate the material to be stapled so that the staple is clinched from the same side from which it is driven. Stapling machines of this type are shown in the Schafroth Patents Nos. 2,740,119 and 2,897,502 and others.

For production purposes, these stapling machines are frequently mounted in tables or other suitable supporting structures and are power operated. The stapling machines or so-called stapling heads are mounted in the supporting structure so that the covers, the bottoms, or the side or end walls of a carton, or some combination thereof, can be stapled quickly and conveniently. Since the stapling machines are usually placed at the end of a conveyor line, they are usually power driven so that an operator need only actuate certain controls in order to perform the stapling operation after the carton has been properly positioned or oriented in the machine.

In the past, table stapling machines of this type have not been provided with adjusting means for adjusting the penetration of anvils into the cartons. One of the principal objects of the present invention is to provide means easily accessible to the operator for the anvil adjustment of the lower head of the stapling machine. Another object is to provide a removable sectional conveyor for quick access to the air pressure regulator system on the machine. Another object is to provide relatively light means for moving the upper stapling head toward the carton without having to move the entire heavy carriage.

Another object is to provide a machine which is fully pneumatically operated by the same source of power which actuates the stapling mechanism and which requires no electrical equipment whatever. Another object of the present invention is to provide a power driven stapling machine having a light movable stapling head which is hinged to prevent injury should a portion of the head, usually the magazine, contact an object above the level of the carton to be stapled.

Another object is to use compressed air to quickly and positively orient a carton in the machine, move the stapling head into contacting relation with a carton to be stapled, and then operate the stapling mechanism. Another object is to provide a lightweight table stapling machine having detachable side and end units with adjustable legs. Still another object is to provide a lightweight movable stapling head mounted on a mast which can be secured to either side of the machine so that the feed can be reversed.

These and other objects and advantages will become apparent hereinafter.

The invention is embodied in a stapling machine having means for orienting a carton on the work surface thereof, a conveyor section removably secured to said machine, an air actuated and operated stapling head movably connected to said mast, and an anvil adjustment for the lower head which can be adjusted from the outside of said machine.

Figure 3:
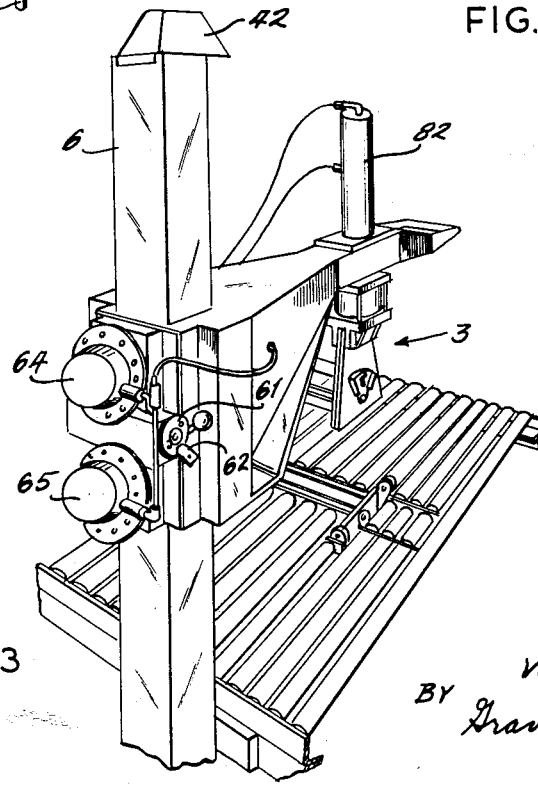
Figure 4:
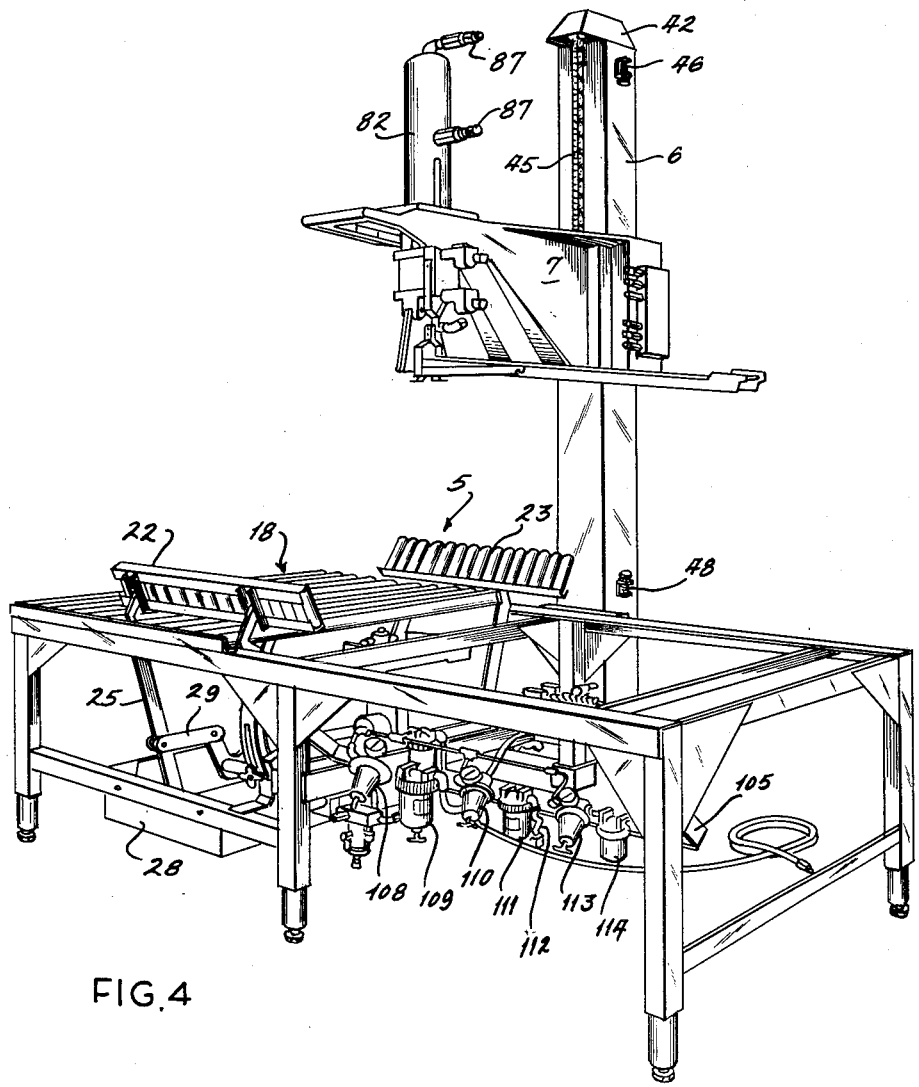
Figure 9:
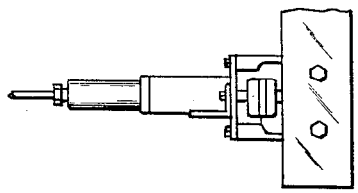

The invention also consists in the parts and in the arrangements and combination of parts hereinafter described and claimed. In the accompanying drawings which form part of this specification and wherein like numerals and letters refer to like parts wherever they occur:

FIG. 1 is a perspective view of a table stapling machine embodying the present invention, FIG. 2 is a perspective view, partly broken, of said machine, FIG. 3 is a fragmentary perspective view of the rear portion of the upper carriage, FIG. 4 is a perspective view, partly broken, with the upper right rollers removed to show the pressure regulator system, FIGS. 5 and 6 are diagrammatic views showing the upper carriage in its upper and lower positions, respectively, FIG. 7 is an end view of the machine showing the mechanism for moving the centering gates, FIG. 8 is a view similar to FIG. 7 showing the mast partially broken, FIG. 9 is a fragmentary cross-sectional view taken along the line 9—9 of FIG. 7, FIG. 10 is a fragmentary cross-sectional view taken along the line 10—10 of FIG. 8, FIG. 11 is a fragmentary partially broken side view of the upper carriage, FIG. 12 is a top plan view of the upper carriage, FIG. 13 is a side view of the anvil adjustment linkage for the lower head, FIG. 14 is a front view of said linkage, and FIG. 15 is a diagrammatic view of one pneumatic system for operating the various air cylinders and air valves of the machine.

Referring now to the drawings in detail, it will be seen that the embodiment of the invention which has been illustrated comprises a table stapling machine 1 having a frame 2 supporting one or more stapling heads 3 and 4, an automatic carton orienting and centering means 5, an upstanding tower or mast 6 removably secured to one side of said frame 2, a carriage 7 slidably mounted on said mast 6, and a safety hinge 8 between said carriage 7 and the upper stapling head 3.

The frame 2 comprises two side units 9 each having three supporting legs 10 which can be adjusted to an appropriate height. Each leg 10 comprises an upper leg portion 11 which telescopes over a lower leg portion 12. A pin 13 is inserted into one of a series of vertically spaced holes 14 in the lower leg portion 12. A screw 15 through the upper leg portion 11 secures the two leg portions together and prevents the lower leg portion 12 from falling out of the upper leg portion 11 if the frame 2 is lifted. Separate end units 16 are fastened to the side units 9 by bolts 17 or the like so that the frame 2 can be knocked down for shipment or storage. The frame 2 contains a work surface 18 which comprises a plurality of spaced transverse rollers 19 and 20 extending between said side units 9. The rollers 19 adjacent to the carton centering means 5 extend completely across the frame 2. The rollers 20 at the opposite half portion of the machine are divided so as to accommodate the magazine of the inverted lower stapling head 4 which drives staples into the bottom of a carton. These rollers 20 are also mounted as a removable section unit 21 for quick access to the regulator system.

The carton centering means 5 comprises two longitudinal contact members 22 normally positioned slightly inwardly of the side units 9. The contact members 22 preferably are provided with a plurality of rollers 23. Each contact member 22 has two downwardly extending arms 24 and 25 pivotally connected thereto, said arms extending through the transverse openings 26 in the work surface 18 between said rollers 19. The lower end of each arm 24 and 25 is pivotally mounted on a pin 27 which is fixed on a sub-frame 28. Each of the arms 24 and 25 has an inwardly extending substantially horizontal bar 29 having a driving link 30 thereon pivotally secured to a gear or gear segment 31. One pair of opposing arms 24 has an air cylinder 32 mounted horizontally therebetween on pins 33. The gear segments 31 have shafts 34 mounted in the centering means sub-frame 28 which contains the pins 27. Another set of gear segments 31 are mounted on said shafts 34 and are operatively connected to the arms 25 by means of bars 29 and driving links 30.

An upstanding tubular mast 6 is removably secured to the center leg of one side unit 9 by means of brackets 35 and bolts 36 and a lower support 37 secured near the bottom of said leg. The carriage 7 is slidably mounted on said mast 6 so that it can be moved vertically with ease to any desired height. The mast 6 has four sides 38 including the rear side 39 and a hollow center 40 for receiving a counterweight 41, with a protective cap 42 at the top thereof. The top and bottom of the mast 6 are provided with axles 43 which receive wheels or gears 44 which in turn receive a chain 45 secured to the counterweight 41 and the top and bottom of the carriage 7. The counterweight 41 slides within the opening 40 in the mast 6 but is limited in its movement by an upper stop 46 connected to a spring 47 and by a lower stop 48 connected to a spring 49, said stops 46 and 48 being suitably secured to the sides 38 by brackets 50 mounted on the outside of the mast 6. The carriage 7 has suitable bumpers 51 thereon for contacting said stops 46 and 48. If desired, the lower gear or wheel 44 can be connected to an air motor on the lower support 37 which is actuated whenever the carriage 7 is moved, thereby eliminating almost all effort to move the carriage 7 up or down on the mast 6.

The carriage 7 has an enlarged rear portion 52 provided with an opening 53 for receiving the mast 6. This opening 53 is surrounded by a front roller 54 and two side rollers 55 at the top portion thereof, and a front roller 56 and two side rollers 57 at the bottom portion thereof, each roller being mounted on a pin 58. A rear eccentric roller 59 is mounted on a rear plate 60 on the carriage 7 to close the opening 53. The rear roller 59 can be moved toward and away from the mast 6 to provide the proper tightness by moving the eccentric 61 and locking the clamp 62 which moves the rear roller pin 63 with respect to the rear of the mast 6.

The rear plate 60 of the carriage 7 is also provided with an upper air brake 64 and a lower air brake 65 to lock the carriage 7 to the mast 6. Each air brake comprises a housing 66 with a diaphragm 67 therein adapted to contact a head 68 to a piston 69 which is mounted within a guide 70 in a flange 71 and secured to a brake 72 which is in direct contact with the rear 39 of the mast 6. A spring 73 is provided to normally bias the enlarged head 68 leftwardly away from the mast 6. Each brake housing 66 has an inlet 74 for receiving an air line 75.

The carriage is also provided with a handle 76 having a trigger 77 therein which if pulled toward the operator allows the carriage 7 to be moved up or down vertically on the mast 6. The trigger 77 is connected to a bar 76 having an end 79 which is operatively connected to a valve 80 and a trigger return spring 81. Pulling the trigger 77 causes the valve 80 to release air from the air brakes 64 and 65 to release same from the rear side 39 of the mast 6, thereby permitting the operator to move the carriage 7 up or down on the mast 6. Because of the counterweight 41, the only force required by the operator is that necessary to overcome the slight friction of the parts to mechanically change the height of the carriage 7. However, an air motor can be provided for this if desired.

The forward portion of the carriage 7 is provided with an actuator 82 for raising and lowering the upper stapling head 3, which is provided with a stapling mechanism 83, a penetration control 84, a trip mechanism 85 and a magazine 86. The upper head 3 is pivotally mounted on the safety pin or hinge 8 to prevent damage to cartons or to the machine in the event that a higher carton has not cleared the upper magazine 86 when the operator attempts to staple a smaller carton. The actuator 82 moves the upper head 3 vertically within limits with respect to the carriage 7.

The actuator 82 has air inlets and outlets 87 for receiving air upon actuation of the valve or foot pedal 88 operated by the operator. The upper stapling head 3 is provided with an air cylinder 89 and inlets and outlets 90 for actuating the stapling mechanism 83 therein. The lower stapling head 4 is also provided with an air cylinder 91 and inlet and outlet controls 92 for actuating same. The actuator 82 and its operation are more fully described in the Schafroth Patent No. 2,900,637 dated August 25, 1959.

The lower stapling head 4 is also provided with anvil control or adjustment means 93 suitably secured to linkage, as shown in FIGS. 13 and 14, which can be conveniently operated by the operator. The lower head 4 has an adjusting cam 94 thereon to which is secured a cam extension 95. The cam extension 95 is provided with a pin 96 for receiving a connecting rod 97 whose forward end is pivotally mounted to an upper lever arm 98. The upper lever arm 98 is mounted on a pin 99 and is secured to a lower lever arm 100 which is received in a lower arm extension 101 which has a handle 102 mounted thereon on the forward portion of a clamp bracket 103 having a slot 104 therein.

This is best shown in FIGS. 13 and 14, wherein the handle 102 is near the top of the slot 104 so that the cam 94 is in its leftward position. As the handle 102 is moved downwardly in the slot 104 the lower lever arm 100 pivots downwardly and the upper lever arm 98 pivots rightwardly thereby moving the cam 94 rightwardly. The handle 102 can then be rotated to lock it against the clamp bracket 103 to prevent the lower head 4 from getting out of adjustment. The anvil adjusting means 93 and cam 94 both for the upper head 3 and lower head 4 are shown in detail in the Schafroth Patent No. 2,897,502 dated August 4, 1959. Thus, the lower head 4, which is virtually inaccessible to the operator, can be conveniently adjusted from the front of the machine to control the depth of the penetration of the anvils by simply moving the handle 102 up or down within the slot 104 in the bracket 103 on the front of the machine.

An upper head shut off control 106 and a lower head shut off control 107 are provided at the front of the machine. The pressure system devices are shown conveniently mounted on a bar 105 along the right half of the forward portion of the machine 1. The bar 105 contains a pressure regulator 108 and gauge for the stapling heads 3 and 4, a lubricator 109 for the stapling heads with a drain therein, a pressure regulator 110 and a gauge for the centering device 32, a lubricator 111 for the centering device 32 with a drain therein, a centering device shut off control 112, a pressure regulator 113 for the actuator 82 for the upper head 3, and a lubricator 114 therefor. The machine is also provided with a foot pedal 88 for controlling the machine and the necessary hose connections, as shown in FIG. 15. The only external means required for operating the machine is a source of compressed air at a minimum of about 60 pounds per square inch.

In operation, the table stapling machine 1 shown in FIG. 1 is preferably placed at the end of a conveyor line in a plant or factory so that filled or loaded cartons are received from the left and are directed onto the work surface 18 between the carton centering means 5 whose contact members 22 are normally in their spread position as shown in FIG. 1. Prior to stapling any carton, the carton centering means 5 and the carriage 7 are adjusted so as to accommodate the size of carton which is to be stapled in great numbers. The centering means 5 can accommodate cartons having a width of 2 to 25 inches. The carriage 7 can be moved vertically on the mast 6 so as to be able to staple cartons from 2 to 40 inches in height. No uniformity is required. Preferably, the normal inoperative position of the carriage 7 should be such that the feet of the trip mechanism 85 are approximately 2 to 4 inches above the carton to be stapled. The carriage 7 is adjusted by squeezing the trigger 77 in the handle 76 to disengage the brakes 64 and 65 from the rear of the mast 6. The counterbalanced carriage 7 can then be moved vertically by hand to the desired height. The trigger 77 is then released thereby allowing the air to force the diaphragms 67 and brakes 72 into frictional engagement with the mast 6. Of course, there must be a source of compressed air to the machine, preferably about sixty pounds per square inch, and the individual stapling heads 3 and 4 must be properly adjusted. Compressed air is required for the stapling heads 3 and 4, the centering means 5, and the actuator 82.

When a carton moves onto the work surface 18 between the carton contact members 22, the operator depresses the pedal 88 which forces contact members 22 inwardly toward each other an equal amount thereby centering the carton on the work surface 18. Depressing the pedal 88 to its intermediate position causes air to be forced into the horizontal air cylinder 32 which has a piston therein which is moved so as to project the piston rod 32a therefrom to spread one pair of arms 24. The pivoting movement of the arms 24 moves the bars 29 and the links 30 connected thereto to rotate the gear segments 31 which insure equal movement of the arms 24. The gear segments 31 in turn rotate the shafts 34 which in turn rotate a second pair of gear segments 31 which move the links 30 and bars 29 of the other pair of arms 25. Thus, the linkage is such that movement of the piston in the air cylinder 3 causes equal movement in each of the four arms 24 and 25 thereby causing the contact members 22 to move an equal distance inwardly to orient and center the carton to be stapled.

The operator moves the carton rightwardly between the upper and lower stapling heads 3 and 4 and depresses the pedal 88 to its lowest position thereby allowing air to be directed to the upper end of the actuator 82 which has a piston therein with a piston rod whose movement causes a similar downward movement of the upper stapling head 3 with its air cylinder 89. The upper head 3 moves downwardly until its trip mechanism 85 contacts the carton. In so doing, the trip mechanism 85 automatically actuates the air valves 90 and 92 which allows air to be directed into the air cylinders 89 and 91 mounted on the upper and lower stapling heads 3 and 4. The operation of the air control means for each stapling head is described in the Schafroth Patent No. 2,900,637 dated August 25, 1959. Thus, a staple is driven into the cover and bottom of the carton simultaneously. When the pedal 88 is released, air is directed into the bottom of the actuator 82 to return the upper head 3 to its upper position approximately three or four inches above the carton. If desired, the valves 106 and 107 can be set so that only the upper head 3 or only the lower head 4 operates, such as for setting cartons up.

When cartons of different heights are stapled, the operator sometimes neglects to move the previous taller carton rightwardly beyond the end of the upper magazine 86. Sometimes, the operator might inadvertently place his hand on a carton which has already been stapled. In either event, the downward movement of the carriage will either damage the tall carton, damage the magazine 86, or cause injury to the operator. To prevent this, the safety hinge 8 is provided between the upper stapling head 3 and its support bracket so that if the magazine 86 contacts any foreign object it will be free to rotate upwardly to prevent damage or injury. The foreign object may then be removed and the upper stapling head 3 automatically returns to its position.

This machine is reversible and versatile, is light in weight, and requires no electrical connections for operating either the box centering means, the movable carriage, or the control means for the individual stapling heads.

FIG. 15 shows a diagrammatic view of one pneumatic system for operating the various air cylinders of the table stapling machine previously described. Referring to FIG. 15, a compressor supplies compressed air directly or indirectly to one or more, filter, oiler, and regulator units which are mounted on the bar 105 of the stapling machine itself so that the dials, filters, and oilers are readily visible to the operator. The system is substantially like the system shown and described in the Schafroth Patent No. 2,894,262 except that the actuator 82 is in the system instead of an air cylinder on the lower portion of the mast 6.

Only one trip mechanism 85 is necessary in the air system of the stapling heads since lines are directed into the corresponding places of the air valve of the lower stapling head so as to actuate the remote stapling head 4 when the upper stapling head 3 is actuated upon actuation of said trip mechanism 85.

The system shown in FIG. 15 is representative of one system which can be used. As shown, the centering means 5 is actuated by the pedal 88. If desired, a separate valve can be mounted on the side unit 9 adjacent to the operator so that the operator can operate said valve with his leg or hand to actuate the centering means 5. This valve, not shown, may be of the "normally off" type wherein the operator must depress said valve and keep said valve depressed in order to keep the contact members 22 together. With such a valve, the contact members 22 resume their normal or spread position upon release of said valve. If preferred, the valve may be of the type wherein the contact members 22 remain either in their inner or spread position depending upon the position which the operator sets the valve.

If desired, the foot or hand operated valve for controlling the centering means 5 can be eliminated and suitable valve means can be positioned between the contact members 22 so as to extend upwardly between two adjacent rollers 19 so that the carton itself when passing over said valve actuates the carton centering means 5. The carton depresses said valve thereby moving the contact members 22 inwardly as shown in FIG. 5 where said members remain until said carton has been stapled and moves rightwardly thereby allowing said valve to be released and causing said contact members 22 to assume their spread position shown in FIG. 4.

It is apparent from the foregoing that the table stapling machine described herein is fully pneumatically operated and requires no electrical means thereon whatever. The present machine can operate at high speeds. The carriage 7 is not moved during each stapling operation, but instead, the piston and piston rod within the actuator 82 merely forces the upper head 3 downwardly a few inches to staple a carton. Thus, only the mass of the fewest number of parts actually move to staple a carton. The work surface 18 is provided with a removable unit 21 which gives direct access to the dials and regulators and lubricators mounted on the control bar 105. The handle 102 at the front of the machine allows the operator to adjust the penetration of the anvils conveniently and without going into the machine. Of course, the anvil adjustment 84 for the upper is exposed and conveniently positioned for adjustment by the operator. The carriage 7 can be adjusted to any height desired, there being no steps or intervals of adjustment since the brakes 72 frictionally and directly contact the mast 6.

This invention is intended to cover all changes and modifications of the example of the invention herein chosen for the purpose of the disclosure, which do not constitute departures from the spirit and scope of the invention.

What is claimed is:

1. An air operated table stapling machine comprising a frame having front, rear, and end units, a work surface supported by said units for supporting a carton to be stapled, means for orienting and centering a carton on said work surface, an upstanding mast connected to said frame, said mast having front and rear walls parallel to the rear unit of said frame, a vertically movable carriage slidably connected to said mast above said work surface, said carriage having an actuator and an upper stapling head hingedly connected thereto, a lower stapling head mounted on said frame for stapling the bottoms of cartons on said work surface, said stapling heads provided with anvil adjustment means thereon, said lower stapling head provided with means extending from said anvil adjustment means to the front unit of said frame so as to be accessible to the operator, each of said anvil adjustment means comprising a pivotally mounted cam on said lower stapling head, said cam having a connecting rod connected thereto, said connecting rod connected to a control positioned at the front of said machine, said stapling heads having a stapling mechanism therein which is projected and retracted by an air cylinder thereon, an air valve connected to said air cylinder for controlling same, said upper stapling head having a trip mechanism thereon for actuating said air valve, air cylinders for actuating said carton centering means and said actuator, and means for supplying air under pressure to each of said air cylinders and air valve.

2. An air operated table stapling machine having a work surface with rollers thereon, said machine having an upstanding tubular mast, a counterweight movably mounted within said tubular mast, said mast having a front wall and a rear wall parallel to the forward and rearward edges of said table stapling machine, a chain connected above and below said counterweight and extending over rotatable means at the top and bottom portions of said mast, said chain extending outside of said mast and connected to the top and bottom of a relatively heavy carriage slidably mounted on said mast, said mast having stop means thereon for limiting the movement of said carriage, said carriage having an enlarged portion with an opening therein at the rear thereof for receiving said mast, said opening having rollers at the top and bottom thereof for reducing friction between said carriage and said mast, the walls of said mast each being contacted by a roller whose axis of rotation is parallel to the wall it contacts, a rear plate secured to said carriage and closing said rear opening, said rear plate having an adjustable roller thereon in contact with the rear wall of said mast for adjusting the sliding of the carriage on the mast, said rear plate having air operated brake means positioned above and below said adjustable roller, said brake means being normally forced toward said table stapling machine into contacting relation with the rear wall of said mast by air pressure, said carriage having a trigger thereon which operates a valve for releasing said air pressure from said brake means for moving said carriage, said carriage having an upstanding actuator thereon with an air operated stapling head connected therebelow, means for actuating said actuator to drive said stapling head downwardly, whereby said relatively heavy carriage need not be moved vertically during rapid closing of cartons of substantially the same height.

3. In an air operated table stapling machine having a work surface thereon, an upper stapling head positioned above said work surface, and a lower stapling head positioned beneath said work surface for stapling the bottoms of cartons moving thereover, the improvement which comprises providing anvil adjustment means for said lower stapling head, said anvil adjustment means comprising a pivotally mounted cam on said lower stapling head, said cam having a connecting rod connected thereto, said connecting rod connected to a control positioned at the front of said machine, whereby the operator can adjust the anvil penetration of the lower stapling head from the front of the machine.

4. In an air operated table stapling machine having a work surface thereon, an upper stapling head positioned above said work surface, and a lower stapling head positioned beneath said work surface for stapling the bottoms of cartons moving thereover, the improvement which comprises providing anvil adjustment means for said upper and lower stapling heads, said anvil adjustment means for said lower stapling head comprising a pivotally mounted cam thereon, said cam having a connecting rod connected thereto, said connecting rod connected to a lever arm extending to the front of said machine, said lever arm pivotally mounted on a pin with its forward end extending to the front of said machine, said end having a handle thereon, whereby the operator can adjust the anvil penetration of the lower stapling head by control means positioned at the front of the machine.

5. An upstanding tubular mast of rectangular cross-section for a table stapling machine for stapling cartons, said mast having two pairs of parallel side walls, means for removably mounting said mast on a table stapling machine in a vertical direction with one pair of side walls parallel to the front and rear of said table stapling machine, a carriage slidably mounted on said mast, said carriage having a plurality of rollers which straddle said mast, each of said walls of said mast being contacted by a roller whose axis of rotation is parallel to the wall it contacts, said rollers being mounted on opposite sides of said vertical mast for supporting said carriage in a substantially horizontal position at any desired height on said mast, one of said rollers being an adjustable roller which can be moved toward and away from said mast, air operated brake means mounted on said carriage above and below said adjustable roller for positioning said carriage at a desired height on said mast, a counterweight movably mounted within said tubular mast to compensate for the weight of said movable carriage, upper and lower stop means for limiting the movement of said carriage on said mast, an actuator mounted on said carriage in parallel relation to said mast, said actuator having a stapling head connected thereto for causing said stapling head to move downwardly toward said carton upon actuation of said actuator.

References Cited by the Examiner

UNITED STATES PATENTS

| 2,024,750 | 12/35 | Sims | 1—331 |
|---|---|---|---|
| 2,539,599 | 1/51 | Tubbs | 1—331 |
| 2,799,861 | 7/57 | Allen | 1—331 X |
| 2,894,262 | 7/59 | Schafroth | 1—331 |
| 2,897,502 | 8/59 | Schafroth | 1—406 |
| 2,899,679 | 8/59 | Allen | 1—406 |
| 2,900,637 | 8/59 | Schafroth | 1—44.4 X |

FOREIGN PATENTS 823,442—11/59 Great Britain.

GRANVILLE Y. CUSTER, JR., *Primary Examiner.*